United States Patent
Gopalan et al.

(10) Patent No.: US 11,942,980 B2
(45) Date of Patent: Mar. 26, 2024

(54) PIM CANCELLATION

(71) Applicant: NOKIA SOLUTIONS AND NETWORKS OY, Espoo (FI)

(72) Inventors: Ramasamy Gopalan, Irving, TX (US); Shavantha Kularatna, Flower Mound, TX (US); Artur Drozdz, Cekow (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 65 days.

(21) Appl. No.: 17/627,055

(22) PCT Filed: Jul. 16, 2019

(86) PCT No.: PCT/US2019/041980
§ 371 (c)(1),
(2) Date: Jan. 13, 2022

(87) PCT Pub. No.: WO2021/010986
PCT Pub. Date: Jan. 21, 2021

(65) Prior Publication Data
US 2022/0376736 A1    Nov. 24, 2022

(51) Int. Cl.
*H04B 1/525* (2015.01)
*H04B 1/10* (2006.01)
*H04B 1/12* (2006.01)

(52) U.S. Cl.
CPC .............. *H04B 1/525* (2013.01); *H04B 1/109* (2013.01); *H04B 1/123* (2013.01)

(58) Field of Classification Search
CPC . H04B 1/10; H04B 1/109; H04B 1/12; H04B 1/123; H04B 1/50; H04B 1/52; H04B 1/525
See application file for complete search history.

(56) References Cited

U.S. PATENT DOCUMENTS

| | | | |
|---|---|---|---|
| 9,210,598 B1 * | 12/2015 | Bradley | H04B 17/23 |
| 9,941,959 B2 * | 4/2018 | Heath | H04B 1/525 |
| 10,027,368 B2 * | 7/2018 | Gravely | H04B 1/10 |

(Continued)

FOREIGN PATENT DOCUMENTS

CN    208656765 U    3/2019

OTHER PUBLICATIONS

International Search Report and Written Opinion dated Apr. 23, 2020 corresponding to International Patent Application No. PCT/US2019/041980.

(Continued)

*Primary Examiner* — Quochien B Vuong
(74) *Attorney, Agent, or Firm* — SQUIRE PATTON BOGGS (US) LLP

(57) ABSTRACT

An apparatus is disclosed, comprising means for determining a noise floor for a radio frequency (RF) system. The apparatus may also comprise means for determining a Passive InterModulation (PIM) value of a component of the RF system contributing as a source of PIM; determining that a passive intermodulation (PIM) cancellation system should be enabled if the PIM value is above a predetermined threshold from the noise floor. The apparatus may also comprise means for determining that the PIM cancellation system should be disabled if the PIM value is at or below the predetermined threshold.

24 Claims, 7 Drawing Sheets

(56) References Cited

U.S. PATENT DOCUMENTS

| | | |
|---|---|---|
| 10,039,022 B2 * | 7/2018 | Tsui .................. H04B 17/0085 |
| 2012/0295558 A1 | 11/2012 | Wang et al. |
| 2017/0019279 A1 | 1/2017 | Tobisu et al. |
| 2017/0222858 A1 | 8/2017 | Wilson et al. |
| 2018/0262370 A1 | 9/2018 | Al-Mufti et al. |

OTHER PUBLICATIONS

V. Golikov et al., "Passive intermodulation distortion measurements in mobile communication antennas," IEEE 54th Vehicular Technology Conference. VTC Fall 2001. Proceedings Oct. 7-11, IEEE, vol. 4, Oct. 7, 2001, pp. 2623-2625, XP010562448.

Ye Ming et al., "Relative phase measurement of passive intermodulation products," 2015 12th IEEE International Conference on Electronic Measurement & Instruments (ICEMI), IEEE, vol. 2, Jul. 16, 2015, pp. 1072-1076, XP032913272.

Notification of First Office Action dated Mar. 1, 2023, corresponding to Chinese Patent Application No. 201980100384.5, with Search Report.

Second Office Action dated Jul. 27, 2023 issued in corresponding Chinese Patent Application No. 201980100384.5, with English language summary thereof.

Third Office Action issued in corresponding Chinese Patent Application No. 201980100384.5 dated Jan. 24, 2024, with English language summary thereof.

* cited by examiner

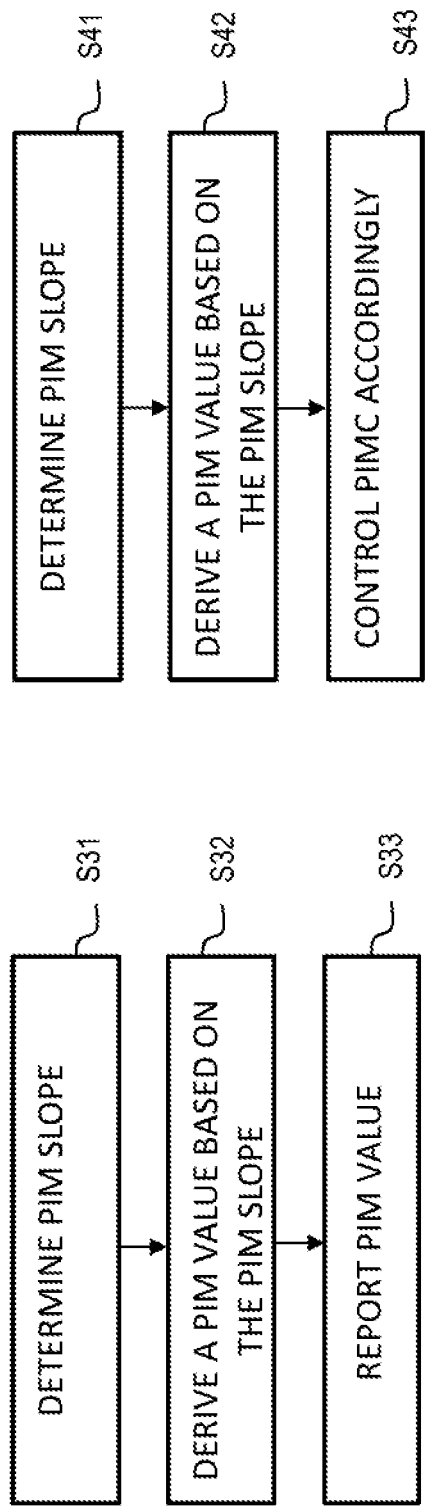

PIM CANCELLATION

FIELD

This specification relates to an apparatus, method and computer program product relating to the cancellation, or mitigation, of Passive InterModulation (PIM).

BACKGROUND

Passive InterModulation (PIM) is a well-known telecom issue. It is caused if plural signals are transmitted through a non-linear system. A non-linear system may be a system comprising active components, but non-linearity may also occur in passive components, usually at higher power than active components e.g. due to corroded connectors etc. If the non-linearity of passive components is severe, even low power may be sufficient to cause PIM. Due to PIM, intermodulation products occur at frequencies corresponding to $k_a f_a + k_b f_b + k_e f_e + \ldots$, wherein $f_a$, $f_b$, $f_c$, ... are the frequencies of the plural signals, and $k_a$, $k_b$, $k_c$, ... are integer coefficients (positive, negative, or o). The sum $k_a + k_b + k_c + , \ldots$ is denoted as the order of the intermodulation product, denoted as IMP3, IMP5, IMP7 etc. for IMP of $3^{rd}$, $5^{th}$, and $7^{th}$ order, respectively (note that these sums may use the absolute values of the k coefficients, in the event that those coefficients may be negative). The amplitude of the IMPs decreases with increasing order of the IMPs. IMP3 is typically most relevant because it is located close to the input signal and has relatively high amplitude. If a broadband signal is transmitted through the non-linear system, PIM may cause the occurrence of side-lobes.

Cellular base stations may de-sense their own uplink owing to PIM products, for example introduced by passive components such as duplexers, cables, connector interfaces, antennas etc. Problems may get worse with the deployment of multi-band (wideband) cellular base stations or multiple co-sited base stations with carrier aggregation. If PIM is not mitigated, e.g. reduced or cancelled, it may not be possible to decode received signals. Operators may use PIM testers during site visits to measure PIM for cancellation or mitigation purposes. PIM measurement is standardized in IEC 62037. In this measurement, two tones each of 20 W are input into the non-linear system, the powers of the IMPs (e.g. IMP3, IMP5, and IMP7, higher order IMPs may be neglected) are measured, and the ratio of the power of IMP3 to the input power at carrier level is taken as a measure of PIM (PIM value). The measure of PIM may arise from a PIM model estimated by a PIM cancellation (PIMC) algorithm.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first example embodiment, there is provided an apparatus comprising means for: determining a noise floor for a radio frequency (RF) system; determining a Passive InterModulation (PIM) value of a component of the RF system contributing as a source of PIM; determining that a passive intermodulation (PIM) cancellation system should be enabled if the PIM value is above a predetermined threshold from the noise floor; and determining that the PIM cancellation system should be disabled if the PIM value is at or below the predetermined threshold.

The means for determining the PIM value may be performed by determining a PIM slope for the one or more components in real-time or near real-time, the PIM slope representing the decibel change in PIM power per decibel change of an applied carrier signal power and applying a current signal power to the determined PIM slope.

The PIM slope may be determined using:

$$\text{PIM slope} = (P - P_{reduced})/P_{diff}$$

where P represents the peak PIM value at an applied carrier signal power, $P_{diff}$ represents the amount by which the applied carrier signal power is reduced and $P_{reduced}$ represents the peak PIM value due to the reduced applied signal power.

The peak PIM value P may be determined by applying artificial noise into available resource blocks of an applied carrier signal, determining the peak PIM value P therefrom, removing the noise from a certain number of the resource blocks to determine $P_{diff}$, and measuring the resulting value of $P_{reduced}$ due to the reduced applied signal power.

The applied artificial noise may be simulated orthogonal channel noise.

The peak PIM value P may be determined by measuring, within a particular time frame and in the presence of real data traffic, the applied signal power, wherein, during said time frame, $P_{diff}$ is determined as the difference between the peak PIM value P and the signal power when orthogonal channel noise is added, and $P_{reduced}$ is determined by statistical measurement of the peak PIM.

The PIM slope may be determined by: determining a measured PIM slope using measurement; determining an actual PIM slope using estimation; modifying terms of the actual PIM slope using a rotational parameter until the actual PIM slope substantially matches the measured PIM slope.

Determining the measured PIM slope may comprise: (i) measuring the transmit power (P_OCNS) in the presence of added noise, measuring a PIM value (PIM_OCNS_measured) under such a condition and (ii) measuring the transmit power (P_Reduced) in the presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

Modifying terms of the actual PIM slope may comprise applying a rotational parameter to one or both of PIM_OCNS and PIM_Reduced until the actual PIM slope substantially matches the actual PIM slope.

The modified terms may comprise $5^{th}$ order components.

The PIM value may correspond to the third order (IM3) PIM component.

The PIM value may be determined relative to the carrier (dBc) and reported as per IEC-62037.

The PIM slope may be used to modify an existing PIM model used to perform PIM cancellation when the PIM cancellation system is enabled.

The apparatus may be provided in, or in association with, a cellular base station.

According to another example embodiment, there may be provided an apparatus comprising means for: determining a PIM slope for the one or more components in real-time or near real-time using measurement, the PIM slope representing the decibel change in PIM power per decibel change of an applied carrier signal power and applying a current signal power to the determined PIM slope; and one or both of (a) reporting a PIM value determined using said PIM slope as per IEC-62037 and (b) controlling a PIM cancellation algorithm based on a PIM value determined using said slope.

The PIM slope may be determined using:

$$\text{PIM slope} = (P - P_{reduced})/P_{diff}$$

where P represents the peak PIM value at an applied carrier signal power, $P_{diff}$ represents the amount by which the applied carrier signal power is reduced and $P_{reduced}$ represents the peak PIM value due to the reduced applied signal power.

The peak PIM value P may be determined by applying artificial noise into available resource blocks of an applied carrier signal, determining the peak PIM value P therefrom, removing the noise from a certain number of the resource blocks to determine $P_{diff}$, and measuring the resulting value of $P_{reduced}$ due to the reduced applied signal power.

The applied artificial noise may be simulated orthogonal channel noise.

The peak PIM value P may be determined by measuring, within a particular time frame and in the presence of real data traffic, the applied signal power, wherein, during said time frame, $P_{diff}$ is determined as the difference between the peak PIM value P and the signal power when orthogonal channel noise is added, and $P_{reduced}$ is determined by statistical measurement of the peak PIM.

The PIM slope may be determined by: determining a measured PIM slope using measurement; determining an actual PIM slope using estimation; modifying terms of the actual PIM slope using a rotational parameter until the actual PIM slope substantially matches the measured PIM slope.

Determining the measured PIM slope may comprise: (i) measuring the transmit power (P_OCNS) in the presence of added noise, measuring a PIM value (PIM_OCNS_measured) under such a condition and (ii) measuring the transmit power (P_Reduced) in the presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

Modifying terms of the actual PIM slope may comprise applying a rotational parameter to one or both of PIM_OCNS and PIM_Reduced until the actual PIM slope substantially matches the actual PIM slope.

The modified terms may comprise $5^{th}$ order components.

According to another example embodiment, there may be provided a method comprising: determining a noise floor for a radio frequency (RF) system; determining a passive intermodulation (PIM) value of a component of the RF system contributing as a source of PIM; determining that a passive intermodulation (PIM) cancellation system should be enabled if the PIM value is above a predetermined threshold from the noise floor; and determining that the PIM cancellation system should be disabled if the PIM value is at or below the predetermined threshold.

Determining the PIM value may be performed by determining a PIM slope for the one or more components in real-time or near real-time, the PIM slope representing the decibel change in PIM power per decibel change of an applied carrier signal power and applying a current signal power to the determined PIM slope.

The PIM slope may be determined using:

$$\text{PIM slope} = (P - P_{reduced})/P_{diff}$$

where P represents the peak PIM value at an applied carrier signal power, $P_{diff}$ represents the amount by which the applied carrier signal power is reduced and $P_{reduced}$ represents the peak PIM value due to the reduced applied signal power.

The peak PIM value P may be determined by applying artificial noise into available resource blocks of an applied carrier signal, determining the peak PIM value P therefrom, removing the noise from a certain number of the resource blocks to determine $P_{diff}$, and measuring the resulting value of $P_{reduced}$ due to the reduced applied signal power.

The applied artificial noise may be simulated orthogonal channel noise.

The peak PIM value P may be determined by measuring, within a particular time frame and in the presence of real data traffic, the applied signal power, wherein, during said time frame, $P_{diff}$ is determined as the difference between the peak PIM value P and the signal power when orthogonal channel noise is added, and $P_{reduced}$ is determined by statistical measurement of the peak PIM.

The PIM slope may be determined by: determining a measured PIM slope using measurement; determining an actual PIM slope using estimation; modifying terms of the actual PIM slope using a rotational parameter until the actual PIM slope substantially matches the measured PIM slope.

Determining the measured PIM slope may comprise: (i) measuring the transmit power (P_OCNS) in the presence of added noise, measuring a PIM value (PIM_OCNS_measured) under such a condition and (ii) measuring the transmit power (P_Reduced) in the presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

Modifying terms of the actual PIM slope may comprise applying a rotational parameter to one or both of PIM_OCNS and PIM_Reduced until the actual PIM slope substantially matches the actual PIM slope.

The modified terms may comprise $5^{th}$ order components.

The PIM value may correspond to the third order (IM3) PIM component.

The PIM value may be determined relative to the carrier (dBc) and reported as per IEC-62037.

The PIM slope may be used to modify an existing PIM model used to perform PIM cancellation when the PIM cancellation system is enabled.

The method may be performed at, or at a system associated with, a cellular base station.

According to another example embodiment, there may be provided a method, comprising: determining a PIM slope for the one or more components in real-time or near real-time using measurement, the PIM slope representing the decibel change in PIM power per decibel change of an applied carrier signal power and applying a current signal power to the determined PIM slope; and one or both of (a) reporting a PIM value determined using said PIM slope as per IEC-62037 and (b) controlling a PIM cancellation algorithm based on a PIM value determined using said slope.

Determining the measured PIM slope may comprise: (i) measuring the transmit power (P_OCNS) in the presence of added noise, measuring a PIM value (PIM_OCNS_measured) under such a condition and (ii) measuring the transmit power (P_Reduced) in the presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

Modifying terms of the actual PIM slope may comprise applying a rotational parameter to one or both of PIM_OCNS and PIM_Reduced until the actual PIM slope substantially matches the actual PIM slope.

The modified terms may comprise $5^{th}$ order components.

According to another example embodiment, there may be provided an apparatus, comprising at least one processor, at least one memory directly connected to the at least one processor, the at least one memory including computer program code, and the at least one processor, with the at least one memory and the computer program code being arranged to perform the method of any preceding method definition.

According to another example embodiment, there may be provided a computer program product comprising a set of instructions which, when executed on an apparatus, is configured to cause the apparatus to carry out the method of any preceding method definition.

According to another example embodiment, there may be provided a non-transitory computer readable medium comprising program instructions stored thereon for performing a method, comprising: determining a noise floor for a radio frequency (RF) system; determining a passive intermodulation (PIM) value of a component of the RF system contributing as a source of PIM; determining that a PIM cancellation system should be enabled if the PIM value is above a predetermined threshold from the noise floor; and determining that the PIM cancellation system should be disabled if the PIM value is at or below the predetermined threshold.

According to another example embodiment, there may be provided an apparatus comprising: at least one processor; and at least one memory including computer program code which, when executed by the at least one processor, causes the apparatus: to determine a noise floor for a radio frequency (RF) system; to determine a passive intermodulation (PIM) value of a component of the RF system contributing as a source of PIM; to determine that a PIM cancellation system should be enabled if the PIM value is above a predetermined threshold from the noise floor; and to determine that the PIM cancellation system should be disabled if the PIM value is at or below the predetermined threshold.

According to another example embodiment, there may be provided a non-transitory computer readable medium comprising program instructions stored thereon for performing a method, comprising: determining a PIM slope for the one or more components in real-time or near real-time using measurement, the PIM slope representing the decibel change in PIM power per decibel change of an applied carrier signal power and applying a current signal power to the determined PIM slope; and one or both of (a) reporting a PIM value determined using said PIM slope as per IEC-62037 and (b) controlling a PIM cancellation algorithm based on a PIM value determined using said slope.

According to another example embodiment, there may be provided an apparatus comprising: at least one processor; and at least one memory including computer program code which, when executed by the at least one processor, causes the apparatus: to determine a PIM slope for the one or more components in real-time or near real-time using measurement, the PIM slope representing the decibel change in PIM power per decibel change of an applied carrier signal power and applying a current signal power to the determined PIM slope; and to perform one or both of (a) reporting a PIM value determined using said PIM slope as per IEC-62037 and (b) controlling a PIM cancellation algorithm based on a PIM value determined using said slope.

BRIEF DESCRIPTION OF THE DRAWINGS

Embodiments will now be described in detail with reference to the accompanying drawings, in which:

FIG. 3 is a flow diagram showing processing operations for reporting a PIM value according to some example embodiments;

FIG. 4 is a flow diagram showing processing operations for controlling a PIM cancellation algorithm according to some example embodiments;

DETAILED DESCRIPTION

Figure 1:
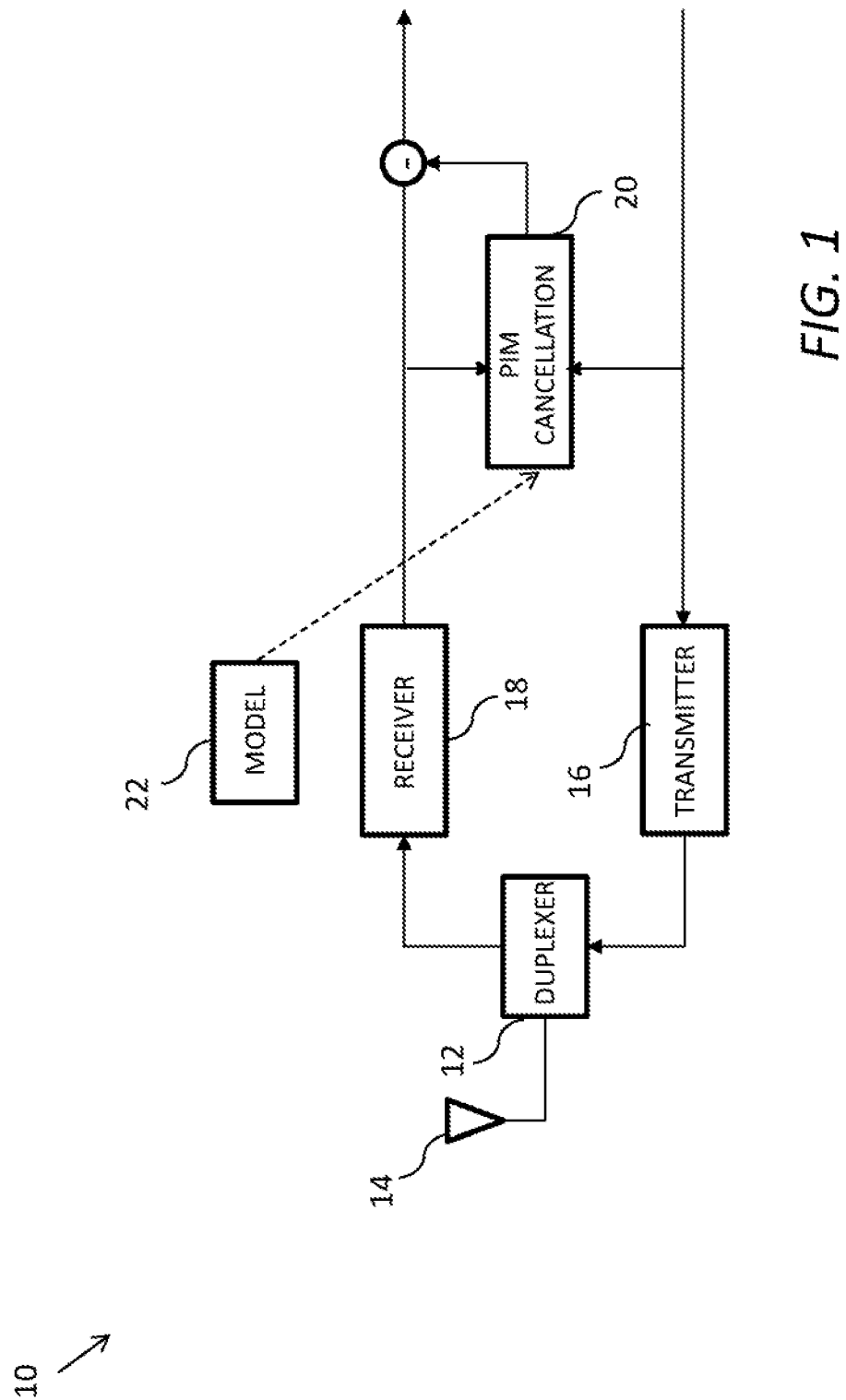
FIG. 1 is a schematic diagram of an example transceiver system 10 that involves PIM cancellation according to example embodiments.

Certain example embodiments are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting to the disclosed details.

Moreover, it is to be understood that the apparatus is configured to perform the corresponding method, although in some cases only the apparatus or only the method are described. The operations of the method may be embodied in a computer program product on, for example, a non-transitory medium.

Certain abbreviations will be used herein, which are set out below for ease of reference.

Abbreviations

2G/3G/4G/5G $2^{nd}/3^{rd}/4^{th}/5^{th}$ Generation
3GPP $3^{rd}$ Generation Partnership Project
CD Compact Disc
DCS Digital Cellular System
DPD Digital Predistortion
DVD Digital Versatile Disk
eNB, NB evolved NodeB
FDD Frequency Division Duplex
IEC International Electrotechnical Commission
IMP/IM Intermodulation Product
IMP3/IMP5/ . . . IMP of $3^{rd}$ order/$5^{th}$ order/ . . .
LMS Least Mean Square NR New Radio
OCNS Orthogonal Channel Noise Simulator
PIM Passive InterModulation
PIMC Passive InterModulation Cancellation
RF Radio Frequency
RX Receive
TX Transmit
UE User Equipment Cellular base stations may de-sense their own uplink owing to PIM products, for example introduced by passive components such as duplexers, cables, connector interfaces, antennas etc. If PIM is not mitigated, e.g. reduced or cancelled, it may not be possible to decode received signals. Operators may use PIM cancellation algorithms to improve uplink signal quality.

Passive InterModulation (PIM) is a physical process where transmit signals generate intermodulation products in passive devices. PIM products may be generated at very low power levels, for example due to the aging of antennas, corroded or loose connectors and duplex filters that are passive. Imperfections of cables, combiners and attenuators may also generate PIM. PIM generation with transmit signals is generally harmless due to its low level. However, when PIM products line up with receive signals, issues can arise. Although the level of PIM in a typical radio can range from −110 dBc to −150 dBc (w.r.t to the transmit signal) it can cause the receiver to desensitize. As an example, a transmit signal that is 49 dBm of power causes PIM levels that are −81 dBm to −101 dBm corresponding to −130 dBc to −150 dBc PIM source range. Hence, on some occasions, PIM signals can be higher than the receive signals. When PIM is higher than the receive signal, the receiver decoding process will fail due to negative signal to noise ratio. This may cause a significant throughput loss in the uplink direction (mobile to base station).

Some radios or associated equipment are designed to mitigate, i.e. reduce or avoid, such PIM effects with PIM cancellation (PIMC) systems or algorithms. In this respect, the term cancellation may also mean mitigate. A PIMC algorithm uses a model that attempts to cancel, or at least reduce, the PIM products on the receiver (Rx) bandwidth.

FIG. 1 is a schematic diagram of an example transceiver system 10 that involves PIM cancellation according to example embodiments. The transceiver system 10 comprises a duplexer 12 connected to a common antenna 14; the duplexer 12 comprises first and second duplexer filters, a first being a transmitter (Tx) duplexer filter having a passband providing a signal path between a transmitter (Tx) 16 and the antenna, and the second being a receiver (Rx) duplexer filter providing a signal path between the antenna and a receiver (Rx) 18. No path between the transmitter 16 and the receiver 18 should exist.

A PIMC module 20 may be provided between the input and output paths of the transmitter 16 and receiver 18 respectively. The PIMC module 20 may be implemented in hardware, software or a combination thereof. The PIMC module 20 operates using an algorithm which is similar to known PIMC algorithms and which uses a PIM model 22 to determine how to cancel the PIM. IEC-62037 describes a way to measure PIM using a so-called two-tone test.

Example embodiments may also involve PIMC algorithms that may be enabled (turned ON) and disabled (turned OFF), which may be applied when the transceiver system 10 operates in a Frequency Division Duplex (FDD) mode. Example embodiments may be applied in any related or future telecoms technology, including for example, 3G, 4G, 5G etc.

PIM effects may differ depending on factors such as, but not limited to, where the base station is positioned geographically, the environment it is in, the specific components used and their interconnections.

PIMC techniques may allow the network operator to turn ON the PIMC algorithm when the radio equipment ages. For example, ageing connectors and bolts of the radio equipment may create intermodulation products that land on receive frequencies causing the receiver SNR to degrade. Thus, this may result in significant uplink throughput losses. Although PIMC algorithms may mitigate the problem by cancelling out interfering PIM products, the time to turn ON the algorithm is a separate, but equally important consideration. The PIMC turn ON decision may be based on the amount of PIM that is above the noise floor. For example, when PIM is detected tens of dB above the noise floor, the accuracy of the extracted PIM model is found to be high. Hence, the PIMC algorithm will substantially eliminate the interfering PIM, enabling the user to recover the loss in throughput. However, when the PIM is only a few dBs above the noise floor, the extracted PIM model may not be that accurate. Thus, the cancellation may, on some occasions, cause more degradation than the interfering PIM signal itself. Therefore, on such occasions, it may be better to leave the PIM products in the uncorrected state to cause no further damage. Besides the level of the PIM signal, the other concern for model extraction is the lack of static and stable downlink traffic during actual operation. Note that real traffic is non-contiguous. Hence, during the model extraction process, the PIMC algorithm may experience little traffic, thus exacerbating the problem of what the input noise would do to the model.

To determine when to turn PIMC ON or OFF, the level of PIM signal in decibels relative to the carrier (dBc) may be used to compare how close it is to the noise floor. A decision threshold may be set a certain number of dBs above the noise floor. If the estimated level of the PIM signal is closer to the noise floor, i.e. at or below the decision threshold, PIMC can be turned OFF. If above, PIMC can be turned ON.

However, the level of the PIM signal can only be accurately determined or estimated when the "slope" of the PIM source presented to the system is obtained either empirically or theoretically, as explained later.

Figure 2:
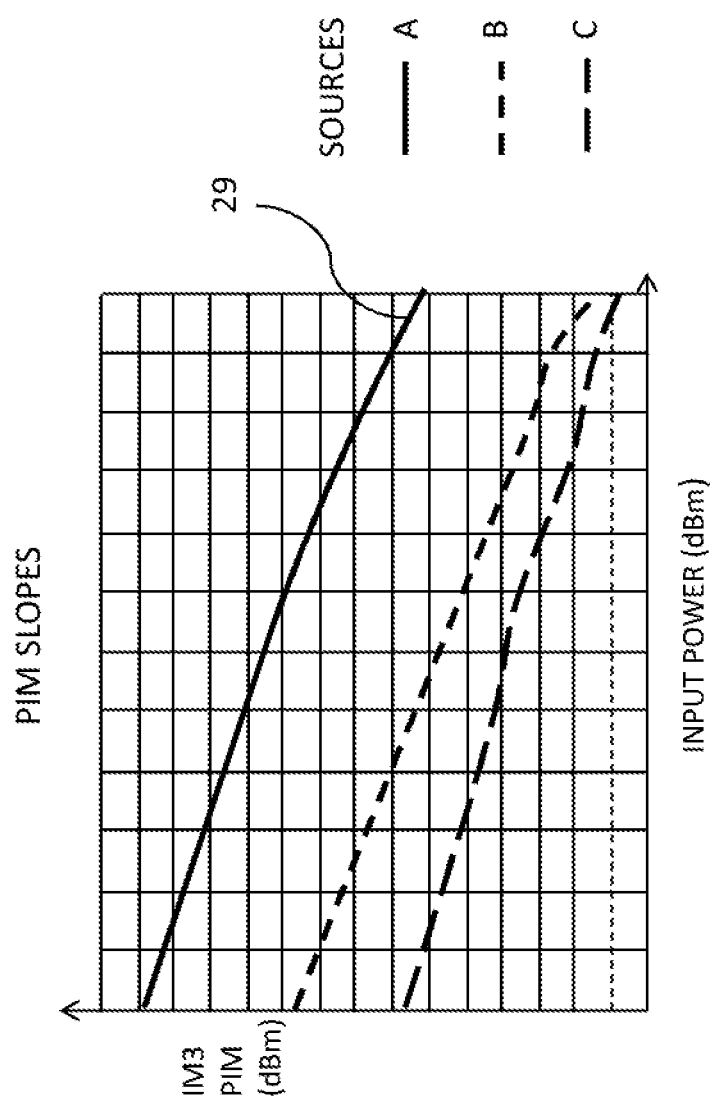
FIG. 2 is a graph indicating PIM slopes for a plurality of sources.

Referring to FIG. 2, a PIM slope 29 refers to the relationship between an input power (in dBm) and PIM signal power (also in dBm) that result from the input signal power. In the FIG. 2 example, the PIM signal power is based on the IM3 component only, and different slopes 29 for each of three different PIM sources are shown. The PIM slope for a given component forms the basis of the model 22 used in PIMC algorithms and systems, e.g. in the PIMC module 20.

If the PIM slope 29 of a PIM source is unknown, even if the model 22 is accurate (e.g. PIMC is ON because PIM signal is determined to be considerably higher than the noise floor) estimation and subsequent reporting of PIM level in dBc, per the IEC-62037 standard, requires "assuming" a "typical" slope of the PIM source based on typical PIM components characterized in a laboratory. Often, the PIM slope 29 of a PIM source in the field is totally different from a typical PIM slope. This may lead to inaccurate estimation and reporting of PIM levels due to mismatch error between the "actual" PIM slope of the PIM source in the field and the "typical" PIM slope of PIM sources characterized in the lab.

Hence, example embodiments relate to characterizing the PIM slope, for example without disrupting the normal operation of the transmitter, for example using live traffic, of the presented PIM source in the field.

An error equation, in dB, representing the mismatch between "unknown, actual" PIM in the field versus "assumed, typical" PIM, based on lab components, can be written as:

$$\text{error}_{dB} = (X_{ref_{dB}} - X_{dB}) \cdot \{m_{assumed} - m_{actual}(t)\} \quad (1)$$

where $X_{ref_{dB}} \rightarrow$ the "reference power" at which a system is calibrated or, equivalently, the "normalized power" with respect to which the estimated PIM level in dBc is reported; With the IEC-62037 standard, $X_{ref_{dB}} = 43$ dBm per carrier (2×43 dBm per carrier);

$x_{dB} \rightarrow$ the transmitted power from the radio;

$m_{assumed} \rightarrow$ the "typical" slope of a PIM source component characterized in the lab. This is a constant, typically an averaged, static slope from different PIM source components; and $m_{actual}(t) \rightarrow$ the "actual" unknown slope of a PIM source in the field, which is a time-varying quantity.

The derivation of equation (1) is presented in the Appendix.

Example embodiments herein provide a way of estimating the real-time slope 29 of a PIM source in the field, which may be presented to a system in the presence of real-time, live traffic. Further, example embodiments may use the estimated PIM slope 29 to determine whether or not to turn PIMC ON or OFF. Further, the estimated PIM slope 29 may be used to report the PIM level in dBc, as per the IEC-62047 standard, more accurately and in real-time or near real-time.

In overview, example embodiments to be described below are based on third order PIM products, i.e. IM3. This is because most in-field configurations are exposed to IM3 PIM products and the PIM level is higher on such products. However, for the avoidance of doubt, example embodiments are not limited to IM3 PIM products, and can be extended to fifth order (IM5) and seventh order (IM7) PIM products etc. if they are relatively higher than the receiver noise floor.

Using mathematical derivations, it can be shown that the power of the third order PIM product IM3 is dependent on the power of transmit signals. Mathematics can also show that, for every 1 dB drop of transmit power, the power of the third order PIM will drop by 3 dB. Hence, with a 2 dB of transmit power, the drop of the third order PIM power is expected to be 6 dB. This is simply annotated by the theoretical 3 dB per 1 dB PIM slope. However, passive devices in nature do not follow the theoretical 3 dB per 1 dB slope. Instead, the typical PIM slopes for practical devices range between 2.2-2.8 dB per every one dB drop.

A PIM slope is intimately related to PIMC ON/OFF decisions. Since an ON/OFF decision occurs when PIM level is closer to the noise floor, the PIMC algorithm cannot rely on the extracted PIM model alone to make a correct decision. PIM slope number will take a higher weight on the decision to turn ON/OFF the PIMC algorithm. The PIM slope also helps characterize the PIM level in dBc at a higher accuracy, which subsequently helps in ON/OFF decisions as well as reporting the "real-time" dBc value of the PIM source per IEC-62037.

Experimental Approach

Where radio equipment utilizes an Orthogonal Channel Noise Simulator (OCNS) for accurate delay search computation, for the PIMC algorithm, the OCNS fills-in unused resource blocks of LTE carriers. Hence, the power of the LTE carrier will be at a maximum during the OCNS transmission. Third order PIM products IM3 will be at their highest power during this time as well. A receiver, e.g. an eNB/gNB/base station noise floor (N dBm per MHz) can be known by prior measurements. Peak PIM power location (frequency) is known from a transmit signal configuration. With an FFT based filter, the peak PIM power per MHz (P dBm per MHz) can also be computed. Now (P-N) dBc will be the level of PIM at the highest point above the noise floor.

Although the calculations are shown using a dBm/MHz basis, software may measure the power across F MHz before normalizing the result on a per MHz basis. The PIM peak will be contained within the F MHz window.

To detect the PIM slope experimentally, the power towards the PIM load needs to be lowered by a known amount. For the purpose of this disclosure, the power reduction is denoted as P_diff.

Regarding when to turn the PIMC algorithm ON or OFF, a first example embodiment will be described. As mentioned above, the OCNS fills-in all available LTE resource blocks. By removing a certain number of resources blocks, the power of the transmit signal can be reduced by P_diff.

Assuming the PIM peak is still well above the noise floor, the peak PIM power per MHz $P_{reduced}$ can be computed as described later on.

Knowing P_diff and (P-$P_{reduced}$), the PIM slope can be computed as follows:

$$\text{PIM slope} = (P - P_{reduced})/P_{diff} \quad (2)$$

A second example embodiment method will now be described. While the first method may require a specific alternation for OCNS, a statistical method may also yield the same answer. The statistical method can be applied with real traffic and so not requiring an OCNS for PIM power measurement.

With the statistical method, it is proposed to monitor the transmit power using power meters. Power meters are available on a per-carrier basis. RF software may be used to measure the statistical power of the transmit signals within a time period from t1 to t2. Baseband transmit signal power measured during this time period is compared with when OCNS is ON. The difference will be equivalent to P_diffnew as in the first method. During the same time (i.e. t1 to t2), the RF software will make a statistical measurement of the PIM at its peak ($P_{reduced\_new}$).

With these measurements the PIM slope can be computed with the equation shown below:

$$\text{PIM slope} = (P - P_{reduced\_new})/P_{diffnew} \quad (3)$$

Note that with a statistical method, the frequency location of the PIM peak may move slightly within the F MHz measurement window. However, the window will be sufficiently wide, and will capture the power of the PIM during the allotted time.

For the final calculation, the PIM power can be normalized to a per MHz basis.

With knowledge of the PIM slope, as well as the baseband signal power via power meters, the level of the PIM signal can be predicted with equation [3]. In addition, RF software can corroborate the predicted answer by performing a statistical measure of Peak PIM power per MHz via FFT filtering, at the same time as when the transmit power was measured.

With knowledge of above steps, we are now able to make an accurate decision as to whether to turn ON/OFF the PIMC algorithm within the radio equipment. If PIM is deemed closer to the noise floor, the algorithm can be turned OFF. If it is reasonably above the noise floor, the algorithm can be turned ON.

Other example embodiments may involve reporting the PIM level per the IEC-62037 standard with an accurate model.

In an example embodiment, as before, the OCNS fills-in all available LTE resource blocks. By removing a certain number of resource blocks, the power of the transmit signal can be reduced by P_diff. Next, the "model" to cancel PIM at full power (i.e., all available resource blocks) can be estimated and at reduced power (i.e. using reduced resource blocks.) The dBc level of PIM signal from the model estimate at full power (denote it as $P_{dBc}$) and reduced power (denote it as $P_{reduced\_dBc}$) can be found. Knowing P_diff and ($P_{dBc} - P_{reduced\_dBc}$), the PIM slope can be computed as follows:

$$\text{PIM slope} = (P_{dBc} - P_{reduced\_dBc})/P_{diff} \qquad (4)$$

A second example embodiment method will now be described. While the first method may require a specific alternation for OCNS, a statistical method may also yield the same answer. The statistical method can be applied with real traffic and thus does not requiring OCNS for PIM power measurement. With the statistical method, the transmit power may be monitored using power meters. Power meters are available on a per carrier basis. RF software may measure the statistical power of the transmit signals within a time period from t1 to t2. Baseband transmit signal power measured during this time period is compared with when OCNS is ON. The difference will be equivalent to P_diffnew_dBc. During the same time (i.e. t1 to t2), the RF software will make a statistical measurement of the PIM level in dBc ($P_{reduced\_new\_dBc}$). With these measurements, the PIM slope can be computed with the equation shown below:

$$\text{PIM slope} = (P_{dBc} - P_{reduced\_new\_dBc})/P_{diffnew\_dBc} \qquad (5)$$

Note that with a statistical method, the frequency location of the PIM peak may move slightly within the F MHz measurement window. However, the window is sufficiently wide, and may capture the power of the PIM during the allotted time. For the final calculation, the PIM power can be normalized to a per MHz basis.

With knowledge of the PIM slope, as well as the baseband signal power via power meters, it is possible to predict the level of the PIM signal with the help of equation [5]. It is also possible to report the PIM signal level in dBc in real-time per the IEC-62037 standard, without interruption to the transmitted signal.

Theoretical Approach

While the experimental approach will provide the actual status or the prediction of the level of the PIM signal, a theoretical approach can be considered as an enhancement. The theoretical approach requires some initial measurements:

a) the level of the PIM with OCNS turned on. As discussed in the prior section, the PIM power can be computed on a specified bandwidth using an FFT based filter. This level will be recorded as P dbm, for the specified bandwidth;

b) with OCNS turned OFF, either of the statistical methods described above can be used to determine the PIM power $P_{reduced\_new}$ dBm within the same specified bandwidth as in a). As described above, P_diffnew (difference in transmit power from measurement a) to b)) can be recorded; and c) knowing the PIM powers of P dbm and $P_{reduced\_new}$ dBm of a) and b), as well as the transmit power difference P_diffnew, the standard PIM model can be modified so that it is able to predict the PIM power variation that adheres to a practical PIM slope. Practical PIM slopes typically range from 2.2-2.8 dB per each dB drop. Note that the theorical PIM predictive models hitherto have not addressed PIM power level differences. The proposed PIM model here addresses that and can predict the PIM level at another power (i.e. usually at a lower transmit power.) A notable advantage of this technique is the accuracy of the PIM power when PIM is closer to the noise floor. So long as step b), the second input to the model, is measured at a relatively higher power (PIM signal well above the noise floor), the derived model is usually unimpacted by the receiver noise floor.

Mathematical Description of the Theoretical Model:

Since the third order (IM3) PIM model is applicable for the vast majority of the PIM configurations, the following mathematical model is derived considering IM3 PIM power in mind. For simplicity, it is assumed that only IM3 is deemed to follow the PIM slope.

Typical PIM model with IM3:

With OCNS turned ON (i.e. with full traffic occupancy of the LTE carriers) the following expression will provide the PIM power within a specified bandwidth. As shown later, the fifth order terms are used primarily to provide extra degrees of freedom to augment the IM3 PIM.

$$\text{Pim\_OCNS} = \text{filt}(c1*x(n)*|x(n)|^2 + c2*x(n-1)*|x(n-1)|^2 + c3*x(n+1)*|x(n+1)|^2 + c4*x(n)*|x(n)|^4 + c5*x(n-1)*|x(n-1)|^4 + c6*x(n+1)*|x(n+1)|^4) \qquad (6)$$

Where the Pim_OCNS signal consist of three memory taps (more can be used if needed.) Coefficients C1, C2, C3, . . . C6 are extracted using the standard least squares method, using conventional techniques. The function filt filters the PIM signal to a known bandwidth (i.e. F MHz). The function filt can either be a time domain mechanism or a frequency domain (i.e. FFT based) mechanism. The term x(n) is the transmit signal. Bandwidth of filt is selected to capture only IM3 PIM components of the PIM signal. The power of the transmit signal can be computed or measured using power meters.

The computed transmit power is given as:

$$P\_OCNS\_trmt = \sum_{i=0}^{i=N} x(n) * conj(x(n)) \qquad (7)$$

The computed transmit power at reduced transmit power is given as:

$$P\_xr\_trmt = \sum_{i=0}^{i=N} xr(n) * conj(xr(n)) \qquad (8)$$

where xr(n) is the equivalent base band signal associated with:

$$\text{Pim\_xr} = \text{filt}(c1*xr(n)*|xr(n)|^2 + c2*xr(n-1)*|xr(n-1)|^2 + c3*xr(n+1)*|xr(n+1)|^2 + c4*xr(n)*|xr(n)|^4 + c5*xr(n-1)*|xr(n-1)|^4 + c6*xr(n+1)*|xr(n+1)|^4) \qquad (9)$$

Note that power of Pim_OCNS and Pim_xr will not follow the expected PIM slope as per the measurements in steps a) and b). Note that the power differences of PIM_OCNS and PIM_xr ought to satisfy:

$$\text{Pim\_OCNS}_{power} - \text{Pim\_Xr}_{power} = \text{Pim}\Delta_{power} \qquad (10)$$

Equation [9], unaltered, will not follow the PIM slope inherent with the two measurements described in a) and b). Some modifications will be required to make it compliant with equation [10].

Note that the concerned PIM power difference ($Pim\Delta_{power}$) is primarily based on IM3 PIM products only. The extra fifth order terms, shown in equation [9], can then be used to rectify the non-compliant problem with the PIM slope. As the reader may be aware, the fifth order terms also contribute energy towards the IM3 PIM products. Hence by manipulating the fifth order terms, it is possible to match any PIM slope that appears in nature.

The technique that makes use of the fifth order terms to predict the IM3 PIM slope is illustrated with equations (11) and (12):

$$Pim_{xr_{matched}} = \text{filt}(c1^*xr(n)^*|xr(n)|^2 + c2^*xr(n-1)^*|xr(n-1)|^2 + c3^*xr(n+1)^*|xr(n+1)|^2 + c4^*r^*xr(n)^*|xr(n)|^4 + c5^*r^*xr(n-1)^*|xr(n-1)|^4 + c6^*r^*xr(n+1)^*|xr(n+1)|^4) \quad (11)$$

$$Pim_{OCNS_{matched}} = \text{filt}(c1^*x(n)^*|x(n)|^2 + c2^*x(n-1)^*|x(n-1)|^2 + c3^*x(n+1)^*|x(n+1)|^2 + c4^*r^*x(n)^*|x(n)|^4 + c5^*r^*x(n-1)^*|x(n-1)|^4 + c6^*r^*x(n+1)^*|x(n+1)|^4) \quad (12)$$

Note that equations [11] and [12] consist of an extra rotation coefficient r that multiplies $5^{th}$ order coefficients c4, c5, and c6. By rotating the $5^{th}$ order, its contribution towards IM3 can be used appropriately to match the PIM slope. In this way, r can be used to match any natural PIM slope in the range of 2.2-2.8 dB per dB power change. Note that the magnitude of r is equal to a. It consists of a complex rotation as shown below:

$$r = \alpha^* \exp(j\theta) \quad (11)$$

where $\theta$ indicates the appropriate rotation and $\alpha$ the appropriate magnitude that are needed to match the PIM slope. The values of $\theta$ and $\alpha$ can be determined iteratively through software.

Once the angle of rotation and magnitude are determined, any future PIM power delta $Pim\Delta_{power}$ due to a reduction of transmit power can be computed using equations [11] and [12] as follows:

$$Pim\_OCNS\_matched_{power} - Pim\_xr\_matched_{power} = (P - P_{reduced_{new}}) = Pim\Delta\_matched_{power} \quad (12)$$

To summarise, equations [11] and [12] are altered to match only the power differences of Pim_OCNS_matched and Pim_xr_matched to $(P-P_{reduced_{new}})$. In other words, Pim_OCNS_matched$_{power}$ and Pim_xr_matched$_{power}$ do not have to be equal to P or $P_{reduced\_new}$. Since P is known, the difference in power is sufficient to predict the PIM power that is compliant with the PIM slope.

FIG. 3 is a flow diagram illustrating operations according to an example embodiment that may be performed by an RF system, for example a control system in, or associated with, a base station.

A first operation S31 may comprise determining a PIM slope using any above method.

A second operation S32 may comprise deriving a PIM value based on the PIM slope.

A third operation S33 may comprise reporting the PIM value, for example as per the IEC-62037 standard.

FIG. 4 is a flow diagram illustrating operations according to another example embodiment that may be performed by an RF system, for example a control system in, or associated with, a base station.

A first operation S41 may comprise determining a PIM slope using any above method.

A second operation S42 may comprise deriving a PIM value based on the PIM slope.

A third operation S43 may comprise controlling PIMC accordingly.

Figure 5:
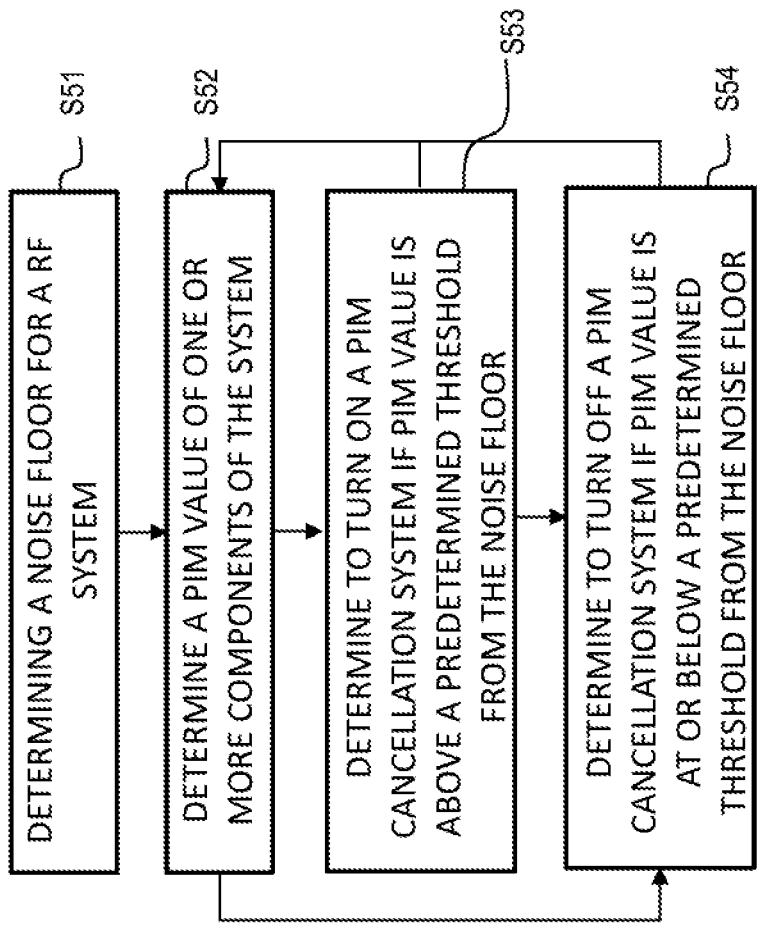
FIG. 5 is a flow diagram showing processing operations for determining whether to turn on a PIM cancellation algorithm according to some example embodiments.

FIG. 5 is a flow diagram illustrating operations according to another example embodiment that may be performed by an RF system, for example a control system in, or associated with, a base station.

A first operation S51 may comprise determining a noise floor for the RF system.

A second operation S52 may comprise determining a PIM value of a source component of the RF system.

A third operation S53 may comprise determining to turn on a PIM cancellation system if the PIM value is above a predetermined threshold from the noise floor. Note that the predetermined threshold may be a configurable parameter.

A fourth operation S54 may comprise determining to turn off a PIM cancellation system if the PIM value is at or below the predetermined threshold from the noise floor.

As the arrows indicate, one of the two operations S33, S34 may be entered from the second operation S32, depending on the current state. Thus, the term "turn" may be replaced with "maintain" with no change to the intended scope of the term if the current on/off state is to remain the same.

Figures 6, 7:
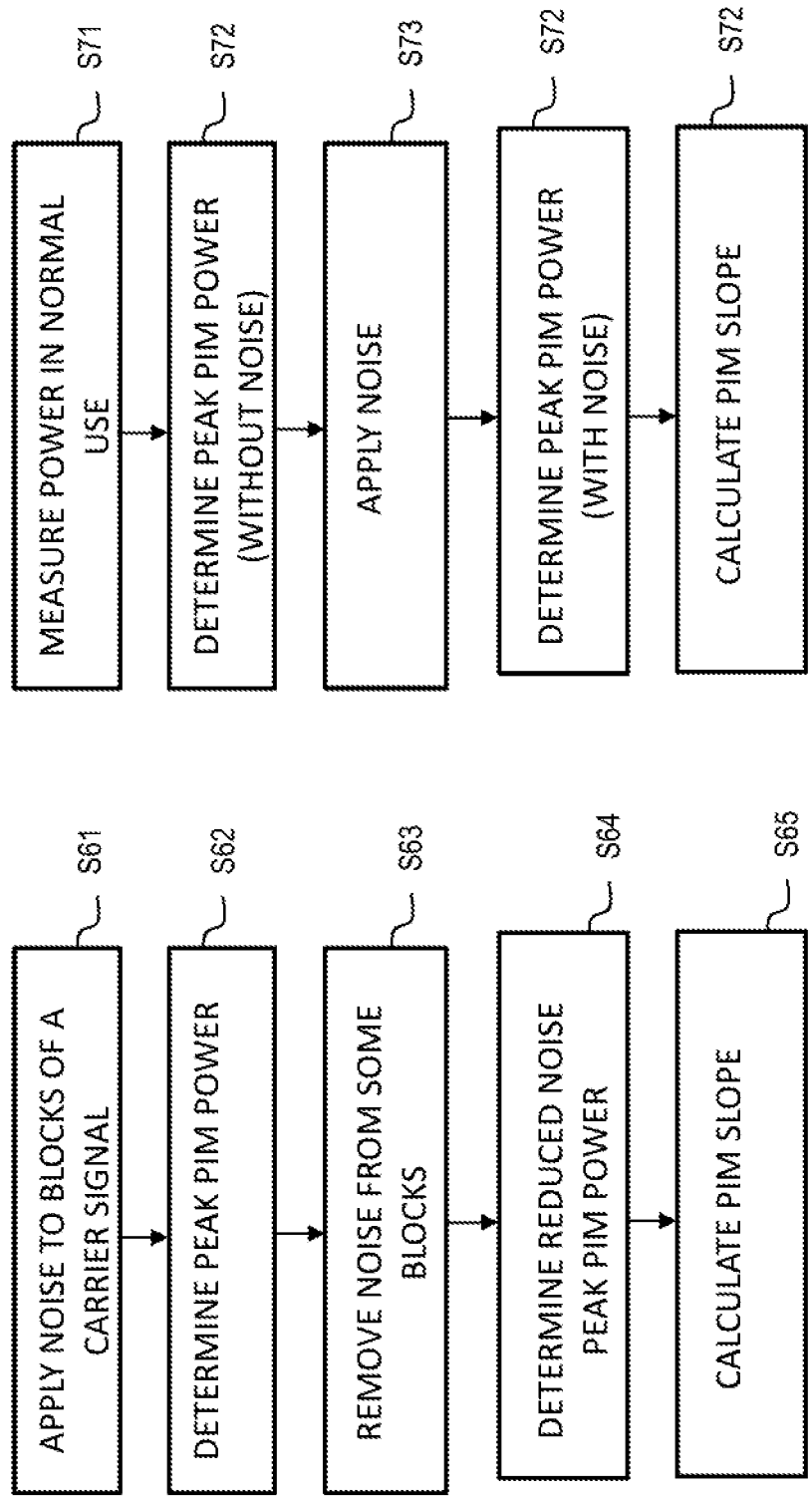
FIG. 6 is a flow diagram showing processing operations for calculating a PIM slope according to some example embodiments.
FIG. 7 is a flow diagram showing processing operations for calculating a PIM slope according to some other example embodiments.

FIGS. 6 and 7 are flow diagrams illustrating operations according to other example embodiments that may be performed by an RF system, for example a control system in, or associated with, a base station. More specifically, FIGS. 6 and 7 relate to calculating the PIM slope using the experimental approach outlined above using noise, for example using OCNS.

Referring to FIG. 6, a first operation S61 may comprise applying noise to blocks of a carrier signal.

A second operation S62 may comprise determining peak PIM power.

A third operation S63 may comprise removing noise from some of the blocks.

A fourth operation S64 may comprise determining reduced noise peak PIM power.

A fifth operation S65 may comprise calculating the PIM slope.

Referring to FIG. 7, a first operation S71 in this case may comprise measuring the power in normal use.

A second operation S72 may comprise determining peak PIM power, without noise.

A third operation S73 may comprise applying noise.

A fourth operation S74 may comprise determining peak PIM power, with the applied noise.

A fifth operation S75 may comprise calculating the PIM slipe.

Figure 8:
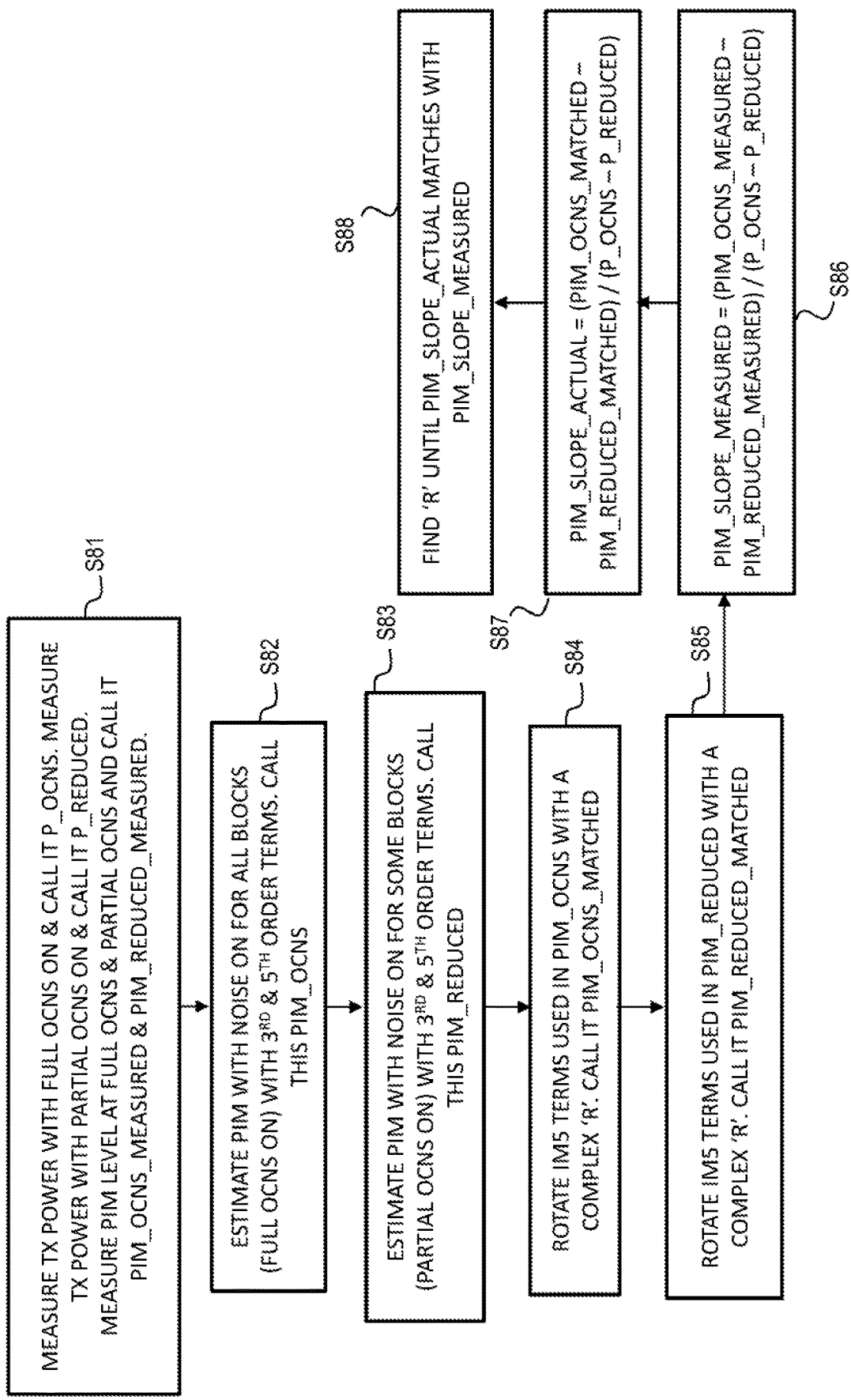
FIG. 8 is a flow diagram showing processing operations for calculating a PIM slope according to some other example embodiments.

FIG. 8 is a flow diagram illustrating operations according to another example embodiment that may be performed by an RF system, for example a control system in, or associated with, a base station. More specifically, the flow diagram relates to the above-mentioned theoretical approach.

A first operation S81 may comprise measuring transmit power with full noise, e.g. OCNS, on, and determining the value to be P_OCNS. The first operation S82, or another operation, may also comprise measuring the transmit power with partial noise, and determining the value to be P_reduced. The first operation S82, or another operation, may also comprise measuring the PIM level with full noise and partial noise and determining the values to be PIM_OCNS_measured and PIM_Reduced_measured respectively.

A second operation S82 may comprise estimating the PIM with noise on for all blacks (with full noise on) with $3^{rd}$ and $5^{th}$ order terms. This value may be determined as PIM_OCNS.

A third operation S83 may comprise estimating the PIM with noise on for some blocks (partial noise on) with $3^{rd}$ and $5^{th}$ order terms. This value may be determined as PIM_Reduced.

A fourth operation S84 may comprise rotating the $5^{th}$ order terms used in PIM_OCNS with a complex rotation 'r.' This value may be determined as PIM_OCNS_matched.

A fifth operation S85 may comprise rotating the $5^{th}$ order terms used in PIM_Reduced with a complex rotation 'r.'

A sixth operation S86 may comprise determining the PIM_slope_measured to be:

(PIM_OCNS_measured–PIM_Reduced_measured)/ P_OCNS–P_Reduced.

A seventh operation S87 may comprise determining the PIM_slope_actual to be:

$$\frac{(PIM\_OCNS\_matched - PIM\_Reduced\_measured)}{P\_OCNS - P\_Reduced.}$$

An eighth operation S88 may comprise finding the rotation 'r' until PIM_slope_actual matches PIM_slope_measured.

Additional operations may be provided in some embodiments.

The operations above, and referred in relation to FIGS. 3-8, may be implemented in hardware, software or a combination thereof.

Figure 9:
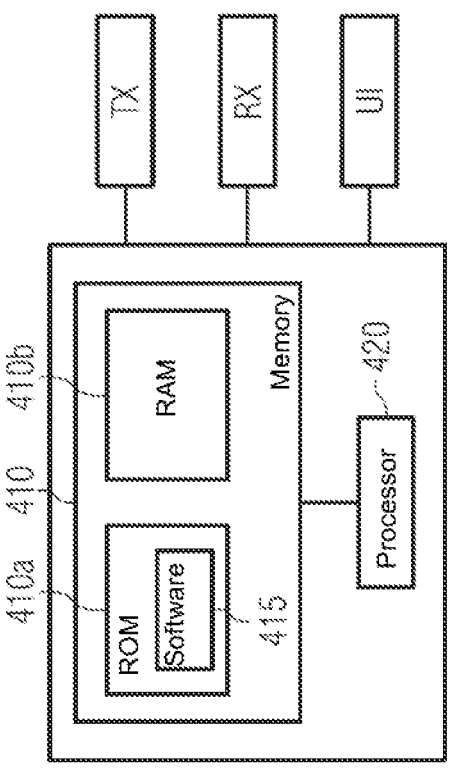
FIG. 9 is a schematic diagram of an apparatus that may be configured according to example embodiments.

FIG. 9 shows an apparatus according to an embodiment. The apparatus may be configured to perform the operations described herein, for example operations described with reference to any one or more of FIGS. 3-8. The apparatus comprises at least one processor 420 and at least one memory 410 directly or closely connected to the processor. The memory 410 includes at least one random access memory (RAM) 410b and at least one read-only memory (ROM) 410a. Computer program code (software) 415 is stored in the ROM 410a. The apparatus may be connected to a TX path and a RX path of a base station in order to obtain respective signals. However, in some embodiments, the TX signals and RX signals are input as data streams into the apparatus. The apparatus may be connected with a user interface UI for instructing the apparatus and/or for outputting results. However, instead of by a UI, the instructions may be input e.g. from a batch file, and the output may be stored in a non-volatile memory. The at least one processor 420, with the at least one memory 410 and the computer program code 415 are arranged to cause the apparatus to at least perform at least the method according to FIG. 3.

Figure 10:
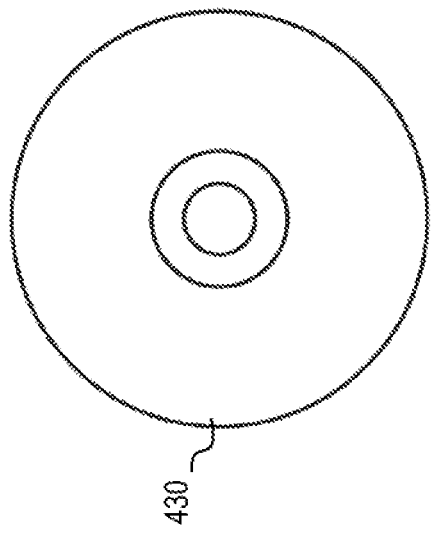
FIG. 10 is a plan view of a non-transitory medium for storing computer-readable code for performance of example embodiments.

FIG. 10 shows a non-transitory media 430 according to some embodiments. The non-transitory media 430 is a computer readable storage medium. It may be e.g. a CD, a DVD, a USB stick, a blue ray disk, etc. The non-transitory media 430 stores computer program code causing an apparatus to perform the method of FIG. 3.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, an eNodeB, a WiFi access point etc.

A memory may be volatile or non-volatile. It may be e.g. a RAM, an SRAM, a flash memory, an FPGA block ram, a DCD, a CD, a USB stick, and a blue ray disk. If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments provide, for example, a PIM slope estimator, a PIMC algorithm module or controller therefore, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

APPENDIX

Derivation of Equation (1)

PIM coefficients obtained from the least-squares method can be expressed as:

$$coeff = \frac{Model \otimes Rx}{Model \otimes Model} \quad (A15)$$

where $\otimes$ represents correlation operator.

At the aligned phase, after doing a delay search (i.e., at the cross correlation peak point), $\otimes$ simply turns to the multiplication operator, and "coeff" is just "gain" of the output/input transfer function, as used in systems theory.

The below equation is valid for single a coeff, in the case of multi-tap coefficients, and we can substitute the "power" term with the FFT amplitude:

$$coeff_{gain} = \alpha \cdot \frac{Model \times Rx}{Model \times Model} \quad (A16)$$

where $\alpha$ is a scalar ($\alpha=1$ implies unity gain) Simplifying it yields:

$$\text{coeff\_gain} = \alpha \cdot \frac{Rx}{\text{Model}} \quad \text{(A13)}$$

Model is our basis function $X \cdot |X|^2$ i.e., denoted as $X^3$ for convenience, and Rx is $X^m$, where $m <_3$ and where X is the Tx power. Since third order (IM3) PIM is most useful, we have used $X \cdot |X|^2$ as our basis function for illustration, and 'm' is the actual PIM slope of the PIM source in the field that is presented to the system.

Substituting this in the above equation, we get:

$$coeff_{gain} = \alpha \cdot \frac{X^m}{X^3} \quad \text{(A18)}$$

which can be written as:

$$coeff_{gain} = \alpha \cdot \frac{X^m}{X^{m+(3-m)}} \quad \text{(A14)}$$

which can be written as:

$$coeff_{gain} = \alpha \cdot \frac{X^m}{X^m \times X^{(3-m)}} = \alpha \cdot \frac{1}{X^{(3-m)}}. \quad \text{(A20)}$$

Now, the theoretical coeffs should be:

$$coeff_{gain\_theoretical} = \alpha \cdot \frac{X^m}{X^m} = \alpha. \quad \text{(A21)}$$

Substituting this, we get:

$$coeff_{gain} = coeff_{gain\_theoretical} \cdot \frac{1}{X^{(3-m)}} \quad \text{(A22)}$$

or, equivalently:

$$coeff_{gain\_theoretical} = coeff_{gain} \cdot X^{(3-m)}. \quad \text{(A23)}$$

Our objective is to get $coeff_{gain\_theoretical}$ so we "de-embed" the actual measured $coeff_{gain}$ by the factor $X^{(3-m)}$.

Now, we have to calibrate (normalize) with a two tone 43 dBm/carrier power, as per IEC-62037, so that the reference power i.e., Xref=43 dBm/carrier.

At m=3, $coeff_{gain\_theoretical} = coeff_{gain} \Rightarrow Rx = Model$ and $X=X_{ref}$ during the calibration/normalization process.

Since IEC-62037 requires estimation and reporting of dBc normalized to Xref=43 dBm/carrier, the linear equation [A23] needs to be normalized to Xref. To do normalization, we modify [A23] as follows:

$$\frac{coeff_{gain_{theoretical}}}{coeff_{gain}} = X^{(3-m)} \quad \text{(A23.1)}$$

Now, we divide the right hand side of equation [A] by $X_{ref}$ to normalize it with respect to $X_{ref}$. Consequently, we divide the left hand side of equation [A23.1] by 1 because at $$X = X_{ref}, coeff_{gain\_theoretical} = coeff_{gain} \Rightarrow \frac{coeff_{gain\_theoretical}}{coeff_{gain}} = 1.$$

Doing these operations gives us equation [A23.2]:

$$\frac{coeff_{gain_{theoretical}}}{coeff_{gain}} = \frac{X^{(3-m)}}{X_{ref}^{(3-m)}} \quad \text{(A23.2)}$$

In dB terms, we can write [A23] as:

$$coeff_{gain\_theoretical\_dB} = coeff_{gain\_dB} + (3-m) \cdot X_{dB}. \quad \text{(A24)}$$

In dB terms, we can write equation [A23.2] as:

$$coeff_{gain\_theoretical\_dB} = coeff_{gain\_dB} + (3-m) \cdot \{X_{dB} - X_{ref_{dB}}\} \quad \text{(A25)}$$

Or equivalently:

$$coeff_{gain\_theoretical\_dB} = coeff_{gain\_dB} - (3-m) \cdot \{X_{ref_{dB}} - X_{dB}\} \quad \text{(A26)}$$

Now, let us denote the actual slope to be $m_{actual}(t)$ and the assumed slope to be $m_{assumed}$.

Therefore, "error" in $coeff_{glain\_theoretical\_dB}$ due to two different slopes now becomes:

$$error_{dB} = (X_{rer_{dB}} - X_{dB}) \cdot \{(3-m_{actual}(t)) - (3-m_{assumed})\} \quad \text{(A27)}$$

i.e.:

$$error_{dB} = (X_{ref_{dB}} - X_{dB}) \cdot \{m_{assumed} - m_{actual}(t)\} \quad \text{(A28)}.$$

The invention claimed is:

1. A method comprising:
   determining a noise floor for a radio frequency (RF) system;
   determining a passive intermodulation (PIM) value of a component of the RF system contributing as a source of PIM;
   determining that a passive intermodulation (PIM) cancellation system should be enabled if the PIM value is above a predetermined threshold from the noise floor; and
   determining that the PIM cancellation system should be disabled if the PIM value is at or below the predetermined threshold.

2. The method of claim 1, wherein determining the PIM value is performed by determining a PIM slope for the one or more components in real-time or near real-time, the PIM slope representing the decibel change in PIM power per decibel change of an applied carrier signal power and applying a current signal power to the determined PIM slope.

3. The method of claim 2, wherein the PIM slope is determined using:

PIM slope=$(P-P_{reduced})/P_{diff}$ where P represents a peak PIM value at an applied carrier signal power, $P_{diff}$ represents an amount by which the applied carrier signal power is reduced and $P_{reduced}$ represents a peak PIM value due to the reduced applied carrier signal power.

4. The method of claim 3, wherein the peak PIM value P is determined by applying artificial noise into available resource blocks of an applied carrier signal, determining the peak PIM value P therefrom, removing the artificial noise from a certain number of the resource blocks to determine $P_{diff}$, and measuring a resulting value of $P_{reduced}$ due to the reduced applied carrier signal power.

5. The method of claim 4, wherein the applied artificial noise is simulated orthogonal channel noise.

6. The method of claim 3, wherein the peak PIM value P is determined by measuring, within a particular time frame and in a presence of real data traffic, the applied carrier signal power, wherein, during said time frame, $P_{diff}$ is determined as the difference between the peak PIM value P and the applied carrier signal power when orthogonal channel noise is added, and $P_{reduced}$ is determined by statistical measurement of the peak PIM.

7. The method of claim 2, wherein the PIM slope is determined by:
   determining a measured PIM slope using measurement;
   determining an actual PIM slope using estimation;
   modifying terms of the actual PIM slope using a rotational parameter until the actual PIM slope substantially matches the measured PIM slope.

8. The method of claim 7, wherein determining the measured PIM slope comprises: (i) measuring a transmit power (P_OCNS) in a presence of added noise, measuring a PIM value (PIM_OCNS_measured) under such a condition and (ii) measuring a transmit power (P_Reduced) in a presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

9. The method of claim 8, wherein modifying terms of the actual PIM slope comprises applying a rotational parameter to one or both of PIM_OCNS and PIM_Reduced until the actual PIM slope substantially matches the actual PIM slope.

10. The method of claim 7, wherein the modified terms comprise $5^{th}$ order components.

11. The method of claim 1, wherein the PIM value corresponds to a third order (IM3) PIM component.

12. The method of claim 1, wherein the PIM value is determined relative to a carrier (dBc) and reported as per IEC-62037.

13. The method of claim 2, wherein the PIM slope is used to modify an existing PIM model used to perform PIM cancellation when the PIM cancellation system is enabled.

14. The method of claim 1, performed at, or at a system associated with, a cellular base station.

15. A method, comprising:
   determining a PIM slope for the one or more components in real-time or near real-time using measurement, the PIM slope representing a decibel change in PIM power per decibel change of an applied carrier signal power and applying a current signal power to the determined PIM slope; and
   modifying and controlling a PIM cancellation algorithm used to perform PIM cancellation based on the determined PIM slope.

16. The method of claim 15, wherein determining the measured PIM slope comprises: (i) measuring a transmit power (P_OCNS) in a presence of added noise, measuring a PIM value (PIM_OCNS_measured) under such a condition and (ii) measuring a transmit power (P_Reduced) in a presence of less or no added noise and measuring a PIM value (PIM_Reduced_measured) under such condition, and wherein determining an actual PIM slope comprises (i) estimating a PIM value (PIM_OCNS) in the presence of added noise and (ii) estimating a PIM value (PIM_Reduced) in the presence of less or no added noise.

17. The method of claim 16, wherein modifying terms of the actual PIM slope comprises applying a rotational parameter to one or both of PIM_OCNS and PIM_Reduced until the actual PIM slope substantially matches the actual PIM slope.

18. The method of claim 17, wherein the modified terms comprise $5^{th}$ order components.

19. An apparatus, comprising:
   at least one processor; and
   at least one memory including computer program code, the at least one memory and the computer program code being configured, with the processor, to perform the method of claim 1.

20. A computer program embodied on a non-transitory computer-readable medium, said computer program comprising a set of instructions which, when executed on an apparatus, is configured to cause the apparatus to carry out the method of claim 1.

21. A computer program embodied on a non-transitory computer readable medium, said computer program comprising program instructions stored thereon which, when executed on an apparatus, cause the apparatus to perform a method, comprising:
   determining a noise floor for a radio frequency (RF) system;
      determining a passive intermodulation (PIM) value of a component of the RF system contributing as a source of PIM;
      determining that a PIM cancellation system should be enabled if the PIM value is above a predetermined threshold from the noise floor; and
      determining that the PIM cancellation system should be disabled if the PIM value is at or below the predetermined threshold.

22. An apparatus, comprising:
   at least one processor; and
   at least one memory including computer program code which, when executed by the at least one processor, causes the apparatus to:
      determine a noise floor for a radio frequency (RF) system;
      determine a passive intermodulation (PIM) value of a component of the RF system contributing as a source of PIM;
      determine that a PIM cancellation system should be enabled if the PIM value is above a predetermined threshold from the noise floor; and
      determine that the PIM cancellation system should be disabled if the PIM value is at or below the predetermined threshold.

23. A computer program embodied on a non-transitory computer readable medium, said computer program comprising program instructions stored thereon which, when executed on a computer, causes the computer to perform the method of claim 15.

24. An apparatus comprising:
   at least one processor; and
   at least one memory including computer program code which, with the at least one processor, causes the apparatus to perform the method of claim 15.

* * * * *